US008958645B2

(12) United States Patent
Lu et al.

(10) Patent No.: US 8,958,645 B2
(45) Date of Patent: Feb. 17, 2015

(54) SYSTEMS AND METHODS FOR TOPIC-SPECIFIC VIDEO PRESENTATION

(75) Inventors: Juwei Lu, Irvine, CA (US); Bradley Denney, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 13/451,436

(22) Filed: Apr. 19, 2012

(65) Prior Publication Data

US 2013/0279881 A1 Oct. 24, 2013

(51) Int. Cl.
*G06K 9/34* (2006.01)
*G06T 7/00* (2006.01)

(52) U.S. Cl.
CPC .................... *G06T 7/0081* (2013.01)
USPC ........................................ 382/182; 386/239

(58) Field of Classification Search
CPC ................................ G11B 27/105; H04N 5/85
USPC ........... 382/195, 199, 225; 725/114; 386/239, 386/353
See application file for complete search history.

(56) References Cited

U.S. PATENT DOCUMENTS

| 2008/0205772 | A1* | 8/2008 | Blose et al. .................... 382/225 |
| 2010/0071016 | A1* | 3/2010 | Uhm et al. ..................... 725/114 |
| 2010/0271395 | A1* | 10/2010 | Isogai et al. ................... 345/635 |
| 2011/0208722 | A1 | 8/2011 | Hannuksela |
| 2011/0249904 | A1* | 10/2011 | Mochizuki et al. ........... 382/225 |
| 2011/0264641 | A1 | 10/2011 | Yang |
| 2012/0002868 | A1* | 1/2012 | Loui et al. ..................... 382/159 |
| 2012/0002881 | A1* | 1/2012 | Maeda ........................... 382/195 |
| 2012/0096359 | A1 | 4/2012 | Denney |

OTHER PUBLICATIONS

IBM Video Semantic Summarization Systems, http://www.research.ibm.com/MediaStar/VideoSystem.html#Database Server, downloaded Nov. 10, 2011.
Tseng, Belle L. et al., Video Summarization and Personalization for Pervasive Mobile Devices, IBM T.J. Watson Research Center.
IBM, VideoAnnEx, http://www.research.ibm.com/MediaStar/VideoAnn.html, downloaded Nov. 10, 2011.
IBM, VideoSue, http://www.research.ibm.com/MediaStar/VideoSue.html, downloaded Nov. 10, 2011.
Ben Wing, Video Summarization, University of Texas, Apr. 2008.
John Hannon et al., Personalized and Automatic Social Summarization of Events in Video, ACM, IUI'11, Feb. 2011.
Nicola Adami et al., An Overview of Video Shot Clustering and Summarization Techniques for Mobile Applications, Second International Mobile multimedia Communications Conference, 2006.
Hung-sik Kim, Video Linkage: Group Based Copied Video Detection, CIVR'08, 2008.

(Continued)

*Primary Examiner* — Thai Tran
*Assistant Examiner* — Mishawn Dunn
(74) *Attorney, Agent, or Firm* — Canon U.S.A., Inc. IP Division

(57) ABSTRACT

Systems and methods for summarizing a video assign frames in a video to at least one of two or more groups based on a topic, generate a respective first similitude measurement for the frames in a group relative to the other frames in the group based on a feature, rank the frames in a group relative to one or more other frames in the group based on the respective first similitude measurement of the respective frames, and select a frame from each group as a most-representative frame based on the respective rank of the frames in a group relative to the other frames in the group.

20 Claims, 11 Drawing Sheets

(56) References Cited

OTHER PUBLICATIONS

Uros Damnjanovic et al., Event Detection and Clustering for Surveillance Video Summarization, IEEE, 2008.
Y. Pritch et al., Clustered Synopsis of Surveillance Video, IEEE, AVSS'09, 2009.
Fact Sheet: BriefCam vs Forensics, BriefCam, Inc., Oct. 2011.
Fact Sheet: BriefCam vs Enterprise, BriefCam, Inc., Oct. 2011.
Tommy Chheng, Video Summarization Using Clustering, University of California, Irvine, downloaded Oct. 2011.
Itheri Yahiaoui et al., Automatic Video Summarization, Multimedia Communications Department, Institut EURECOM, downloaded Oct. 2011.
Boon-Lock Yeo and Bede Liu, Rapid scene analysis on compressed video, IEEE Transactions on Circuits and Systems for Video Technology, vol. 5(6), pp. 533-544, Dec. 1995.
P. Viola and M.J. Jones, Robust real-time face detection, International journal of computer vision, vol. 57(2), pp. 137-154, 2004.
L. Page and S. Brin, and R. Motwani, and T. Winograd, The PageRank citation ranking: Bringing order to the web, Stanford InfoLab, 1999.

* cited by examiner

655 ⌐    660A ↓

| Set | Frame | Topic Score | Frame Rank | Set MRF Score | Group MRF Score |
|---|---|---|---|---|---|
| 575A | 565A | .83 | .19 | 2 | 4 |
|  | 565B | .84 | .17 | 3 | 5 |
|  | 565C | .75 | .22 | 1 | 3 |
|  | 565D | .73 | .11 | 4 | 7 |
| 575B | 565E | .75 | .28 | 1 | 1 |
|  | 565F | .66 | .24 | 2 | 8 |
| 575C | 565G | .69 | .16 | 3 | 9 |
|  | 565H | .85 | .14 | 2 | 6 |
|  | 565I | .78 | .20 | 1 | 2 |

656 ⌐    660B ↓

| Set | Frame | Topic Score | Frame Rank | Set MRF Score | Group MRF Score |
|---|---|---|---|---|---|
| 576 | 566A | .69 | .12 | 4 | 4 |
|  | 566B | .77 | .14 | 2 | 2 |
|  | 566C | .59 | .19 | 3 | 3 |
|  | 566D | .91 | .12 | 1 | 1 |

FIG. 6

SYSTEMS AND METHODS FOR TOPIC-SPECIFIC VIDEO PRESENTATION

BACKGROUND

1. Field

The present disclosure relates to systems and methods for presenting a video.

2. Background

When viewing a video, users must play the video or fast forward or rewind to find content of interest. This can be very time consuming, especially when searching for content of interest among hundreds of videos and thousands of hours of footage.

SUMMARY

In one embodiment, a method for presenting video content comprises assigning a first plurality of frames of a video to a first group based on a first topic; assigning a second plurality of frames of the video to a second group based on the first topic, wherein the video includes at least the first plurality of frames and the second plurality of frames; generating respective similitude measurements for the frames in the first plurality of frames relative to one or more other frames in the first plurality of frames based on a first feature; ranking the frames in the first plurality of frames relative to the other frames in the first plurality of frames based on the respective similitude measurements of the frames in the first plurality of frames; and selecting a frame from the first plurality of frames as a most representative frame based on the respective ranks of the frames in the first plurality of frames. The method further comprises generating respective similitude measurements for the frames in the second plurality of frames relative to one or more other frames in the second plurality of frames based on a second feature, ranking the frames in the second plurality of frames relative to the other frames in the second plurality of frames based on the respective similitude measurements of the frames in the second plurality of frames, and selecting a frame from the second plurality of frames as a most representative frame based on the respective ranks of the frames in the second plurality of frames.

In one embodiment, one or more computer-readable media store computer executable instructions that, when executed by one or more computing devices, cause the one or more computing devices to perform operations comprising assigning frames in a video to one of two or more groups based on a topic, generating respective first similitude measurements for the frames in a group relative to the other frames in the group based on a feature, ranking the frames in a group relative to other frames in the group based on the respective first similitude measurements of the respective frames, and selecting one or more frames from each group as most-representative frames based on the respective ranks of the frames in a group relative to the other frames in the group.

In one embodiment, a system for presenting video content comprises one or more computer-readable media configured to store a video, a first topic, and a first similarity measurement function; and one or more processors configured to cause the system to assign a first plurality of frames of the video to a first group based on the first topic, generate respective similitude measurements for the frames in the first plurality of frames relative to other frames in the first plurality of frames based on the first similarity measurement function, rank the frames in the first plurality of frames relative to the other frames of the first plurality of frames based on the respective similitude measurements of the frames of the first plurality of frames, and select a frame from the first plurality of frames as a most representative frame based on the respective ranks of the frames in the first plurality of frames.

BRIEF DESCRIPTION OF THE DRAWINGS

FIG. 6 illustrates example embodiments of frame score tables.

DESCRIPTION

The following disclosure describes certain explanatory embodiments. Additionally, the explanatory embodiments may include several novel features, and a particular feature may not be essential to practice the systems and methods described herein.

Figure 1:
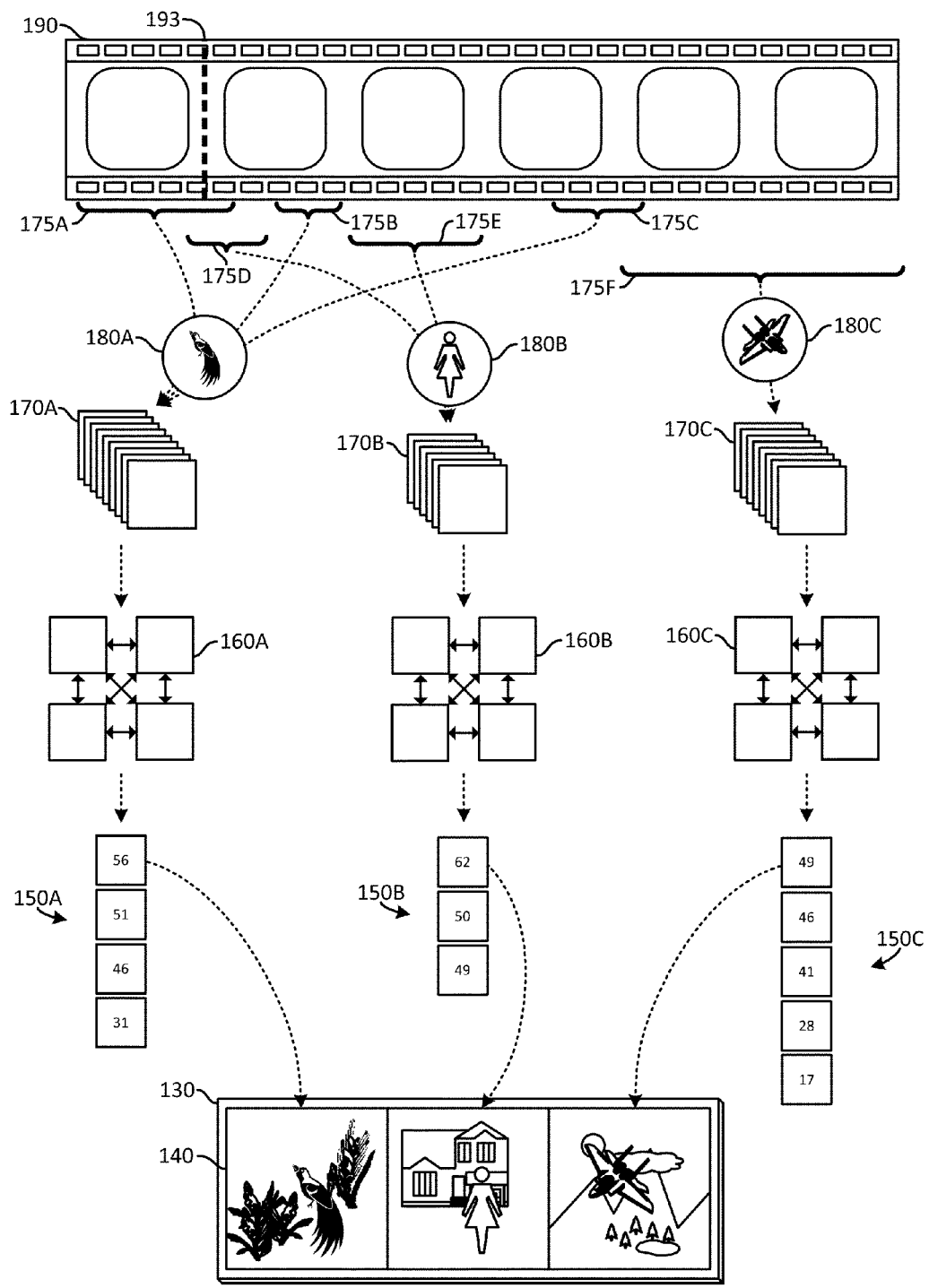
FIG. 1 illustrates an example embodiment of the operations for video summarization.

FIG. 1 illustrates an example embodiment of the operations for video summarization. Frames in a video 190 are analyzed and assigned to groups 170A-C (also referred to collectively as "groups 170"). A frame is a still image from the video sequence, and the six frames of the video 190 are shown to represent any number of frames (thus the video may also include more or less than six frames). The frames are assigned based on topics, and topics include, for example, objects, frame features (e.g., brightness, color(s), a light histogram, sounds, location, textures, shapes, camera angles, zoom), and changes in features (e.g., changes in zoom, sound, camera angle, and colors). In some embodiments the topics (e.g., objects, frame features, changes in features) may each comprise a plurality of sub-topics, as described above. In the embodiment shown, the topics used to assign the frames are objects 180A-C (also referred to collectively as "objects 180"). Depending on the embodiment, a frame may be assigned a score based on the topic or sub-topic (e.g., object 180A, object 180B, object 180C). For example, if a first object 180A is the topic or sub-topic, a score may indicate the probability that a frame includes the first object 180A. Other scores may be based on other topics, for example a rate of change, a color histogram, a tone histogram, and a sound volume. A filter may apply a criterion to a frame to determine if a frame should be selected. The criterion may define a standard (e.g., a measurement, a score) for an associated topic. For example, the criterion of the filter associated with the first object 180A could be a minimum score. Other example criteria include a maximum brightness level, a rate of zoom change, similarity to a shape, and similarity to a texture.

Based on the topic(s), sub-topics, and criteria, sets of one or more frames 175A-F (also referred to herein as "sets of frames 175A-F" or collectively as "sets of frames 175") of the video 190 are assigned to respective groups 170. In this embodiment, the sets of frames 175 for respective topics are non-exclusive, so a frame may be in more than one set of frames 175 and groups 170, for example frame 193. Frame 193 is included in a first set of frames 175A and a second set of frames 175D, and frame 193 is included in a first group 170A and a second group 170B. Also, a topic may be associated with multiple groups, for example groups based at least in part on temporal segments (e.g., when the first object 180A is the topic, a first group includes the frames in a first set of frames 175B and a second group includes the frames in a second set of frames 175C), and a group may or may not correspond to a topic (e.g., one to one or one to many correspondence between topics and groups). Additionally, in some embodiments frames that are not initially assigned to a group (e.g., one of the illustrated groups 170A-C) are assigned to an additional group (i.e., a "negative" group). These unassigned frames may be summarized using default settings (e.g., topics for feature selection, linkage, thresholds, feature weight). The frames in a "negative" group could be given lower priority or ranking than "positive" frames in a video summary (e.g., be positioned lower in a hierarchy of frames).

After the frames are assigned to groups 170, the frames within a group are compared with one another to find respective similitude measurements 160A-C. A similitude measurement indicates a similarity of a frame to one or more other frames (e.g., all of, or a subset of, the frames in a group 170) based on one or more features. Next, the similitude measurements 160 from the groups 170 are used to generate frame ranks 150A-C. Then one or more frames, designated most-representative frames (also referred to collectively as "MRFs"), are selected based on one or more criteria. The selection may include generating a most-representative-frame score (also referred to herein as an "MRF score"), for example based on one or more of a frame rank, a topic score (e.g., an object score, a change score), a size of the respective group 170, and a local maximum in scores/ranks. Finally, the MRFs are added to a video summary 140, and, when the video summary 140 is presented on a display device 130, the MRFs are included in a display.

Figure 2:
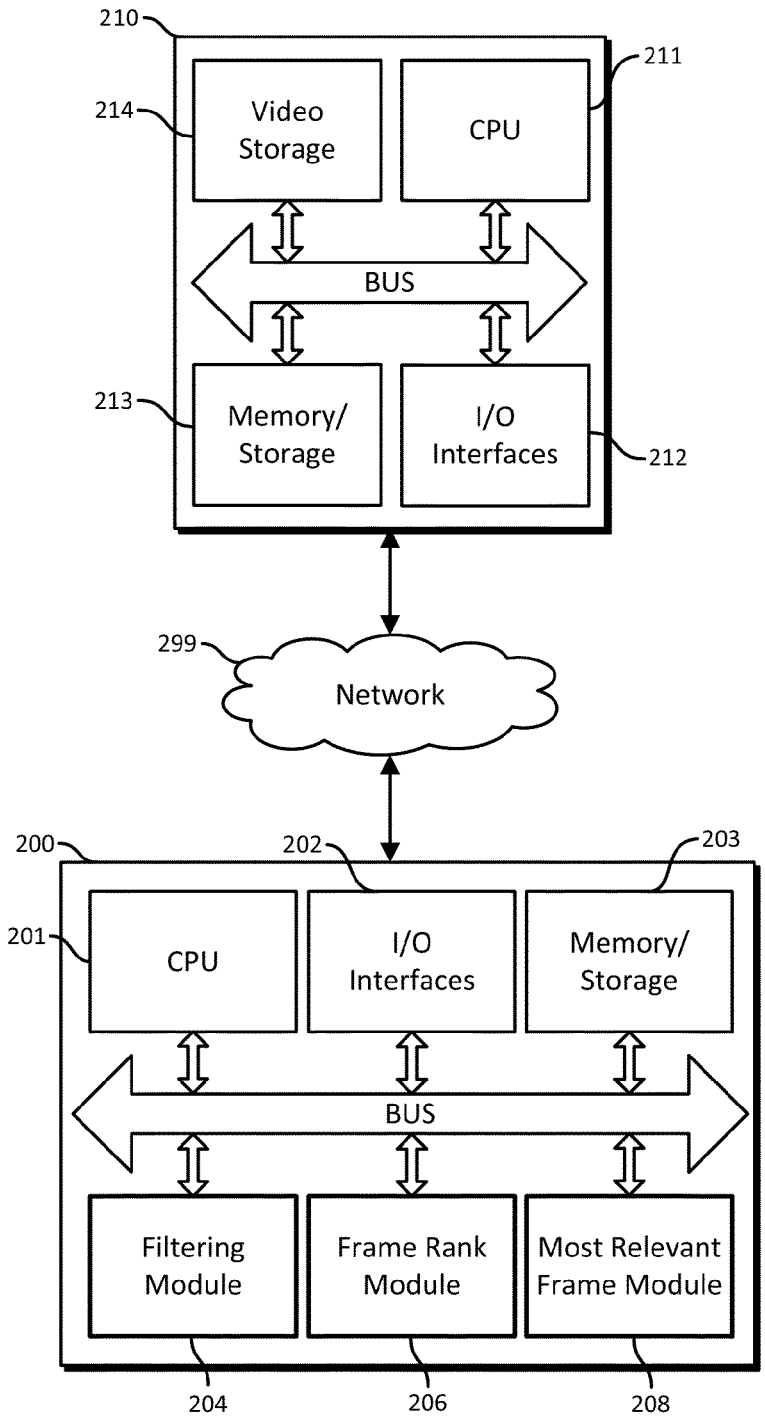
FIG. 2 is a block diagram that illustrates an example embodiment of a system for video summarization.

FIG. 2 is a block diagram that illustrates an example embodiment of a system for video summarization. The system includes a summarization device 200 and a video storage device 210, though in other embodiments the functionality of the summarization device 200 and the video storage device 210 may be combined into one device or further divided into more devices. The summarization device 200 and the video storage device 210 communicate via one or more networks 299, which may include, for example, LANs, MANs, WANs, and the Internet, and which may be wired and/or wireless.

The video summarization device 200 includes one or more processors 201 (also referred to herein as "CPU 201"), which may be conventional or customized central processing units (e.g., microprocessor(s)). The CPU 201 is configured to read and implement computer-executable instructions, for example instructions stored in the memory/storage 203, instructions contained in one or more modules, etc. The computer-executable instructions may include those for the performance of various methods described herein. The CPU 201 may command and/or control other components of the video summarization device 200. The video summarization device 200 also includes I/O interfaces 202, which provide communication interfaces to input and output devices, including, for example, a keyboard, a display, a mouse, a printing device, a touch screen, a light pen, an optical storage device, a scanner, a microphone, a camera, and a drive. The I/O interfaces 202 also allow the video summarization device 200 to communicate with the network 299 and other systems and devices via the network 299, and the I/O interfaces 202 may have wired and/or wireless capabilities.

The video summarization device 200 additionally includes memory/storage 203, which includes one or more computer-readable media and is configured to store data and/or computer-executable instructions. Computer-readable media include, for example, a magnetic disk (e.g., a floppy disk, a hard disk), an optical disc (e.g., a CD, a DVD, a Blu-ray disc), a magneto-optical disk, a magnetic tape, and semiconductor devices (e.g., a non-volatile memory card, flash memory, DRAM, SRAM, a solid state drive, an EPROM, an EEPROM). The components of the video summarization device 200 are connected via a bus. Also, the video summarization device 200 includes an operating system, which manages one or more of the hardware, the processes, the applications, the interrupts, the memory, and the file system.

The video summarization device 200 also includes a filtering module 204, a frame rank module 206, and a most relevant frame module 208 (which are stored in the memory/storage 203 or in other computer-readable media). A module includes computer-executable instructions that may be executed by one or more members of the video summarization device 200 (e.g., the CPU 201) to cause the video summarization device 200 to perform certain operations, though for purposes of description a module may be described as performing the operations. Modules may be implemented in software (e.g., JAVA, C, C++, C#, Basic, Assembly), firmware, and/or hardware. In other embodiments, the video summarization device 200 may include additional modules, the modules may be combined into fewer modules, and/or the modules may be divided into more modules. Furthermore, when the computer-executable instructions are executed, an operating system executing on the video summarization device 200 may perform at least part of the operations that implement the instructions.

The instructions in the filtering module 204 may be executed to cause the video summarization device 200 to assign frames in a video to one or more groups based on one or more topics. The instructions in the frame rank module 206 may be executed to cause the video summarization device 200 to generate similitude measurements for, and/or to generate frame ranks for, frames in a group relative to one or more of each other based on one or more features. Also, the instructions in the most relevant frame module 208 may be executed to cause the video summarization device 200 to determine the most relevant frames in a group based on one or more criteria.

The video storage device 210 also includes a CPU 211, I/O interfaces 212, and memory/storage 213. The video storage device 210 also has video storage 214 that includes one or more computer-readable media configured to store videos. The video storage device 210 may send videos from the video storage 214 to the video summarization device 200, for example in response to a request from the video summarization device 200.

Figure 3:
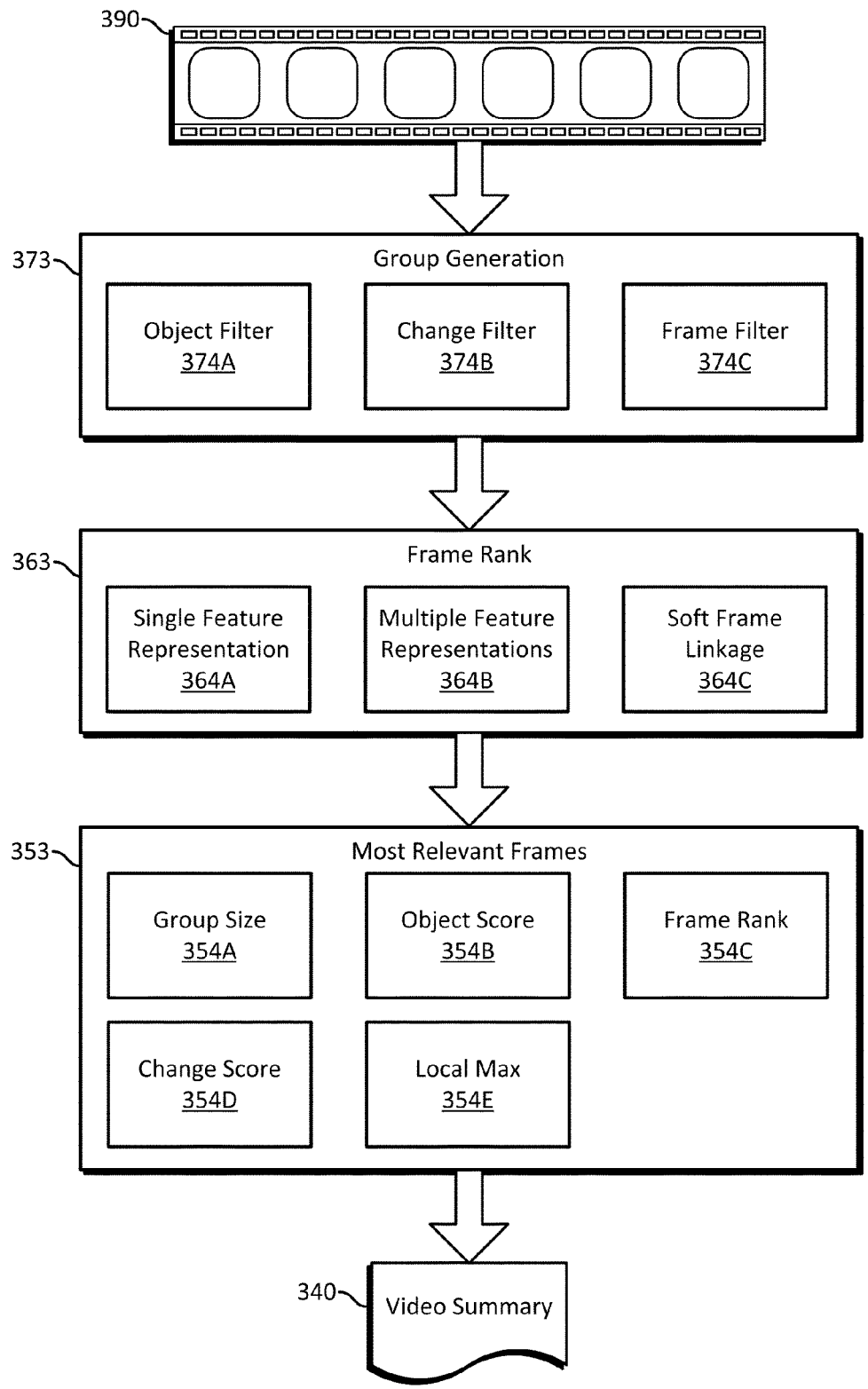
FIG. 3 is a flow diagram that illustrates an example embodiment of video summarization.

FIG. 3 is a flow diagram that illustrates an example embodiment of video summarization. In block 373, group generation is performed on the frames of a video 390. During group generation, one or more frames in the video 390 are assigned to one or more groups based on one or more topic filters (a filter may define a topic, a sub-topic, and an associated criterion). Topic filters include an object filter 374A, a change filter 374B, and a frame filter 374C. A filter may generate a score for a respective frame based on the associated topic. The score may indicate, for example, a probability that a frame includes one or more objects, changes, or features; or a measurement of a feature or a change.

The object filter 374A may be applied to one or more frames to determine whether the frames include one or more specified objects. For example, an object filter 374A may be applied to a frame (e.g., by a computing device) to determine if the frame includes the first object 180A, which is a bird. Applying a filter to a frame may include detecting one or more features in the frame, for example by using scale-invariant feature transform (SIFT), histogram of oriented gradients (HOG), edge orientation histograms, shape contexts, edge detection, speeded up robust features (SURF), grammars, and/or shading. The detected features may be used to generate a score that indicates a probability that the frame includes the first object 180A.

The change filter 374B may be applied to a frame to detect whether one or more features of a frame have changed relative to previous or subsequent frames. For example, a change filter 374B may be applied to a frame to determine if the frame's zoom, sound, brightness, camera angle, viewpoint, or color histogram is different than previous or subsequent frames, or may be applied to frames to determine if objects are moving within the frames. The change filter 374B may be based on a magnitude of change of a feature within a certain number of frames or within a certain time. For example, the change filter may be based on a derivative (e.g., first derivative, second derivative) of a feature (e.g., sound, brightness) with respect to a certain period of time or a certain number of frames. Also, an inflection point of the second derivative may be used to delineate a boundary between sets of frames (e.g., the sets of frames 175 in FIG. 1). In some embodiments, a score that the change filter 374B generates for the associated frame is based on one or more of the magnitude of the change, a first derivative, and a second derivative.

The frame filter 374C may be applied to a frame to detect whether one or more features of a frame are within certain respective ranges (e.g., above a threshold, below a threshold, within an upper threshold and a lower threshold). Features include, for example, brightness, color(s), histogram(s) (e.g., image histogram, color histogram), sound (e.g., overall sound amplitude, certain frequencies of sound, certain channels (e.g., 5.1 surround sound, 7.1 surround sound) of sound), a location of the scene shown in the frame, and texture(s). The filter 374C may be used to generate a score for each feature or a score that is based on multiple features.

Additionally, the object filter 374A, the change filter 374B, and/or the frame filter 374C, may define respective criteria (e.g., thresholds) to delineate between frames that are added to a group and frames that are not added to a group. Also, a threshold may be used to simplify a continuous score into a binary value (e.g., any value above 0.5 is a binary 1, any value of 0.5 or below is a binary 0). Furthermore, a score may be partially simplified into a binary value (e.g., 0 below the threshold, a continuous value above the threshold), and may be similar to a high-pass filter or a low-pass filter. Thus, if a score has any value between 0 and 1, and the threshold filters out any score below 0.5, a score that is not filtered out could have any value between 0.5 and 1. Furthermore, multiple thresholds can be used, for example a lower threshold and an upper threshold, similar to a band-pass filter.

After frames are sorted into groups in block 373, flow proceeds to block 363, where frames are assigned respective frame ranks. In this embodiment, the frame ranks are assigned according to a single feature representation 364A, multiple feature representations 364B, and/or a soft frame linkage 364C (all of which may be implemented in modules).

A frame rank assignment is based on one or more similitude measurements, which indicate how similar a frame in a group is to one or more other frames (including all other frames) in the group based on one or more features. A similitude measurement may be further based on one or more links.

When applied to a group of frames (e.g., by a video summarization device), the single feature representation 364A generates a similitude measurement for a frame based on the single feature in the frame and the other frames in the group. For example, where $x_i$ is the feature of the i-th frame, a link is generated between two frames, the i-th frame and the j-th frame, according to $$L_{ij} = \begin{cases} 1 & s(x_i, x_j) > \theta \text{ and } i \neq j \\ 0 & \text{otherwise,} \end{cases}$$

where $s(x_i, x_j)$ denotes a similarity measurement function between two frames based on the single feature, and $\theta$ is a threshold to define a link based on a similarity measurement of the two frames. Examples of similarity measurement functions include histogram intersection, and cosine similarity. Some similarity measurement functions may stem from Manhattan distance, Euclidean distance, and Chi-squared distances, for example. Additional similarity measurement functions (which may include a measurement of dissimilarity) are described in U.S. patent application Ser. No. 12/906,107, filed on Oct. 17, 2010, which is incorporated by reference. Also, similarity measurement functions and/or similarity measurements may be either symmetric or asymmetric.

Next, a frame rank p for the i-th frame may be generated according to $$p_i = (1 - d) + d \sum_{j=1}^{N} \left( \frac{L_{ij}}{c_j} \right) p_j,$$

where $c_{j=1} L_{ij}$ is the number of frames pointed to by the j-th frame and d is a predetermined parameter, which ensures that each frame gets a rank value of at least 1-d. The solution may be generated iteratively by the power method. Also, a frame rank p for the i-th frame may be generated according to $$p_i = \sum_{j=1}^{N} L_{ij},$$

where N is the total number of frames in the group.

Additionally, the links used to generate frame ranks may be generated using multiple feature representations 364B and soft frame linkage 364C. Multiple feature representations 364B may be applied to a group of frames (e.g., by a video summarization device) to generate a similitude measurement for a frame based on multiple features in the frame and the other frames in the group. A link between frames, the i-th frame the and j-th frame, may be generated according to $$L_{ij} = \sum_{k=1}^{K} L_{ij}^{k},$$

where

-continued $$L_{ij}^k = \begin{cases} q_k, & s_k(x_i^k, x_j^k) > \theta_k \text{ and } i \neq j \\ 0 & \text{otherwise,} \end{cases}$$

and where k is the total number of features, $x_i^k$ is the k-th features of the i-th frame, $s_k(x_i^k, x_j^k)$ denotes a similarity measurement function for the k-th feature between two frames, $q_k$ with $\Sigma_k q_k=1$ denotes a prior for the k-th feature, and $\theta_k$ is a threshold to define a link based on a k-th feature similarity of the two frames. The prior $q_k$ may be adjusted to control the significance of the k-th feature to the link and/or frame rank. Thus, a link may be the aggregate of multiple similarity measurements or multiple links.

Furthermore, soft frame linkage 364C may be applied to a group of frames to generate respective links. For example, soft frame links may be generated according to $$L_{ij} = \begin{cases} \exp\left\{-\dfrac{[d(x_i, x_j)]^2}{(2\sigma^2)}\right\} & i \neq j \\ 0 & i = j, \end{cases}$$

where $d(x_i, x_j)$ is a distance function (or a dissimilarity measurement generated from another similarity measurement function) of a feature between two frames; and $\sigma$ is a parameter that may be fixed, estimated globally, or may be estimated locally around frame i, frame j, or a combination of the two (depending on the embodiment). When using multiple soft links, the links may be combined to form a single soft link.

Additionally, the links may be combined to form a product or be combined using a multivariate Gaussian kernel such as $$L_{ij} = \begin{cases} \exp\left\{-\dfrac{1}{2}d(x_i, x_j)^T \Sigma^{-1} d(x_i, x_j)\right\} & i \neq j \\ 0 & i = j, \end{cases}$$

where d is a vector of feature distances (or other dissimilarity measurements), and $\Sigma$ may be a predetermined covariance matrix or may be estimated either locally or globally.

Also, soft frame links may be generated according to $$L'_{ij} = \begin{cases} L_{ij} & L_{ij} > \theta \\ 0 & \text{otherwise,} \end{cases}$$

where $\theta$ is a threshold to define a link based on a similarity of the two frames.

Figure 4:
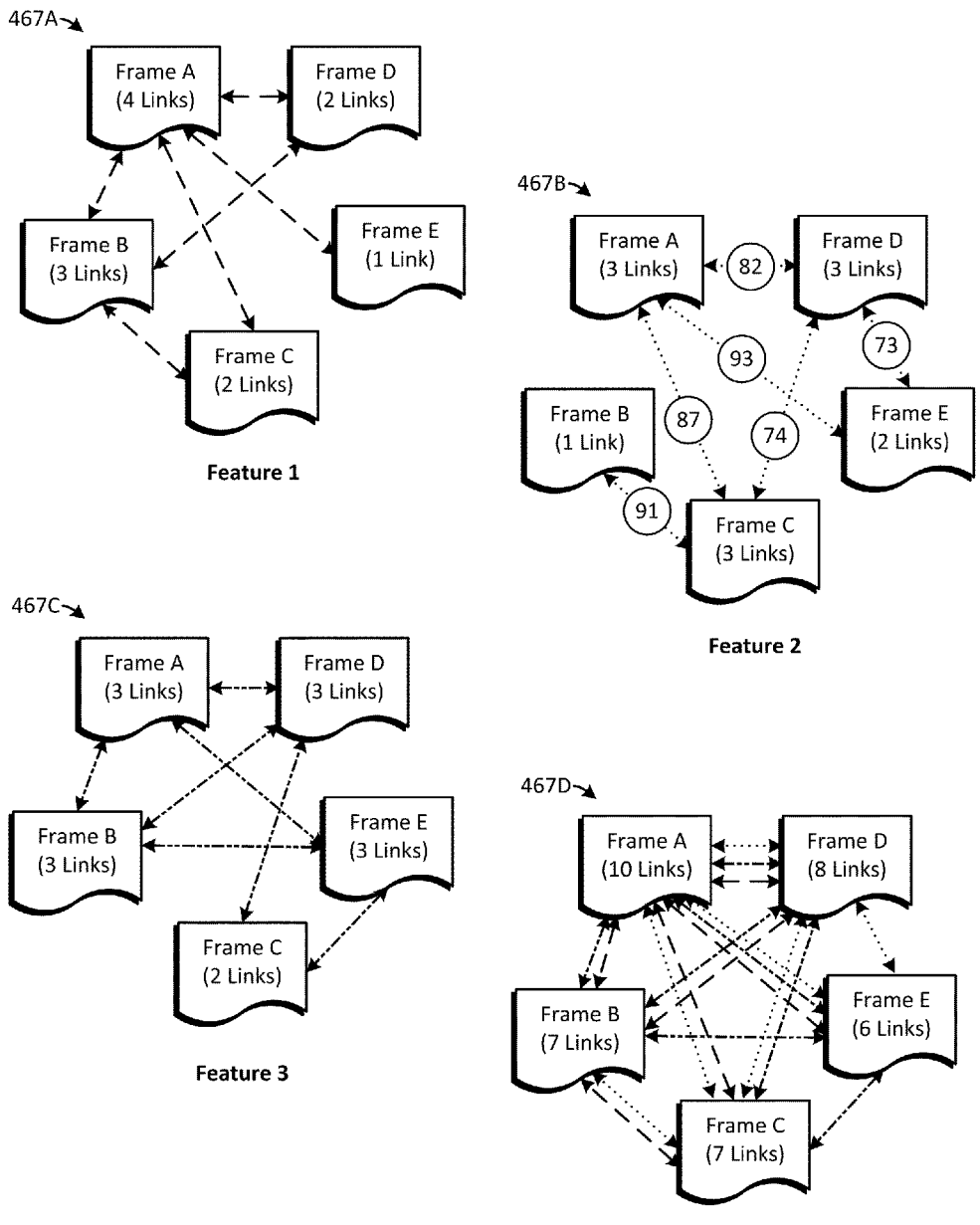
FIG. 4 illustrates example embodiments of frame links.

Example embodiments of frame links are illustrated in FIG. 4. A first linkage graph 467A shows links generated between frames A-E based on feature 1. A link between two frames indicates that a similarity measurement (or a dissimilarity measurement) of feature 1 between the two frames exceeds (or does not exceed) one or more thresholds. For example, assuming that feature 1 is a color histogram and the similarity measurement function is a histogram intersection function, the first linkage graph 467A shows a link between frame A and frame B that indicates the histogram intersection of the color histograms of frame A and frame B exceeds the threshold. Additionally, the respective histogram intersections of the color histogram of frame A and the color histograms of three other frames, frame C, frame E, and frame D, exceed the threshold. However, the respective histogram intersections of the color histogram of frame E and the color histograms of three other frames, frame B, frame C, and frame D, do not exceed the threshold, and thus there are no links between frame E and any of frame B, frame C, and frame D.

Additionally, though the first linkage graph 467A shows binary values (either a link or no link), in some embodiments a link may also be accompanied by a value (e.g., a similarity measurement generated by a similarity measurement function). The second linkage graph 467B shows links accompanied by values. In this embodiment, the links in the second linkage graph 467B are generated using a different similarity measurement function (e.g., cosine distance) and a different feature, feature 2. Also, the third linkage graph 467C shows links that are generated using a third feature, feature 3. However, though a different feature is used, the links in the third linkage graph 467C may be generated using the same similarity measurement function used to form the links in the first linkage graph 467A or the second linkage graph 467B. For example, feature 3 may be the tonal histogram, and the similarity measurement function may be the histogram intersection used to generate the first linkage graph 467A. Moreover, in some embodiments the same feature may be used with different similarity measurement functions.

A cumulative linkage graph 467D aggregates the links from the other linkage graphs 467A-C. In some embodiments, the frame rank for a frame may be just the sum of all the links (or link values) to the frame or the product of the link values of all the links to the frame. In other embodiments, generation of the frame rank is based on other factors, including a weighing of the links (e.g., by adjusting the prior $q_k$). For example, the links in the first linkage graph 467A may be weighed with a 0.5, the links in the second linkage graph 467B may be weighed with a 0.3, and the links in the third linkage graph 467C may be weighed with a 0.2.

Furthermore, though the embodiments of frame links shown in FIG. 4 include symmetric links indicated by bi-directional arrows, other embodiments may include asymmetric links (one-directional arrows.) Thus, if two frames are joined by a symmetric link, each frame "points" to the other, and if two frames are joined by an asymmetric link, one frame "points" to the other.

Referring back to FIG. 3, when block 363 is finished one or more frames in a group will have a respective frame rank. In some embodiments, a respective frame rank is generated for each of the frames in a group.

Flow then proceeds to block 353, where one or more MRFs are selected. In this embodiment, MRFs may be selected based on one or more of the following: a group size 354A, an object score 354B, a frame rank 354C, a change score 354D, and a local max 354E (e.g., the local maximum object score or frame rank). Thus, in some embodiments a frame may have the highest frame rank but not be selected as an MRF. However, in other embodiments the MRFs may be selected based on frame rank only, thus a frame with the highest frame rank will be selected as an MRF. The selected MRFs are added to a video summary 340.

Figure 5:
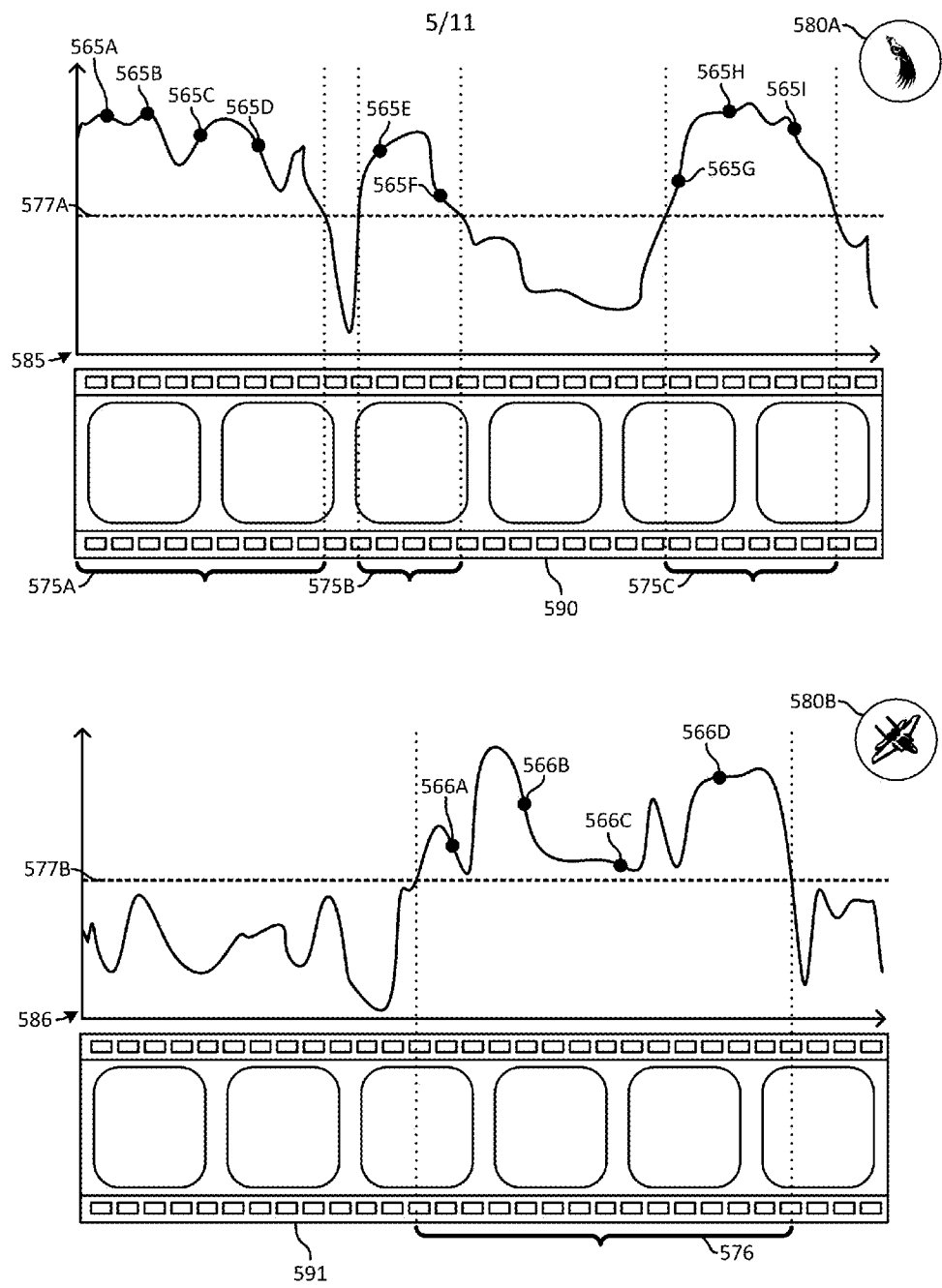
FIG. 5 illustrates example embodiments of group generation and group representation.

Following are examples of video summarization with reference to FIG. 5 and FIG. 6. A first video 590 is input to the group generation block 373. The frames in the first video 590 are filtered according to a topic, which is a first object 580A (described by an object filter 374A). Based on the object filter 374A, respective topic scores are generated for the frames in the first video 590. A first graph 585 shows the topic scores on the vertical axis, with the frames organized on the horizontal axis in the same sequence the frames are presented in when the first video 590 is played. The topic scores (labeled "Topic Score") for certain frames, frames 565A-I, are shown in a first score table 655, shown in FIG. 6. In this embodiment, the topic scores are object scores. A first threshold 577A is applied to the topic scores, and frames are selected, for example the frames in the sets of contiguous frames 575 A-C (also referred to herein as "frame sets 575A-C") whose frames have respective topic scores that exceed the threshold. The selected frames are assigned to a group (or multiple groups, depending on the embodiment). In this embodiment, all of the frames in the frame sets 575A-C are assigned a first group 660A (the first group 660A is shown in the first score table 655), though the first group 660A includes three different sets corresponding to the frame sets 575A-C.

Next, the frames are sent to block 363, where a respective frame rank is generated for each of the frames in the frame sets 575A-C. The frame rank for certain frames (labeled "Frame Rank"), frames 565A-I, are shown in the first score table 655.

Next, the sets of frames are sent to block 353, where respective MRF scores are generated for the frames. Two respective MRF scores for frames 565A-I are shown in the first score table. One score is a set MRF score (where lowest indicates the highest score), which indicates the MRF score of a frame relative to other frames in the same set 575. The other MRF score is a group MRF score, which indicates the MRF score of a frame relative to all other frames in the first group 660A. One or more frames are then added to a video summary 340, based at least in part on the MRF scores. For example, in some embodiments, only the frame with the highest MRF score of any group (the overall MRF score) will be added (a one frame video summary 340), only one frame from each group will be added (e.g., the frame with the highest MRF score in each group), one frame will be added from each set within each group (e.g., the frame with the highest MRF score in each set), or multiple frames will be added from each group or set (e.g., the 3 highest MRF scores per group/set). Other combinations of MRF scores, groups, and sets may be used to select frames to include in the video summary 340.

Also, a second video 591 is input to the group generation block 373 (also, the first video 590 may be input). The frames in the second video 591 are filtered according to a topic, which is a second object 580B (described by an object filter 374A). Based on the object filter 374A, respective topic scores are generated for the frames in the second video 591. A second graph 586 shows the topic scores on the vertical axis, with the frames organized on the horizontal axis in the same sequence the frames are presented in when the second video 591 is played. The topic scores for certain frames, frames 566A-D, are shown in a second score table 656, shown in FIG. 6. A second threshold 577B is applied to the topic scores, and frames, including the frames in a set of contiguous frames 576, whose respective topic scores exceed the threshold are added to a second group 660B (the group shown in second score table 656).

Next, the frames in the second group 660B are sent to block 363, where respective frame ranks are generated for the frames in the second group 660B. The frame ranks for certain frames, frames 566A-D, are shown in the second score table 656.

Afterwards, the frames in the second group 660B are sent to block 353, where respective MRF scores are generated for the frames, and frames are selected to be added to a video summary 340. As is shown by the second score table 656, depending on the function used to generate the MRF scores, a frame may have a higher MRF score (e.g., frame 566D) than frames that have a higher frame rank (e.g., frames 566B-C).

One or more frames from the second group 660B of frames are added to the video summary 340.

Additionally, the video summary 340 may be used to generate a display that presents one or more frames. Depending on the embodiment, a display of the video summary 340 may include one frame or multiple frames from each group (e.g., the first group 660A and the second group 660B). For example, some embodiments display only the frame in the first group 660A that has the highest MRF score, some embodiments display the frames from each group that have the highest group MRF score, and some embodiments display the frames from each set that have the highest MRF score to ensure that at least one frame from each set is displayed.

Some embodiments of the display of the video summary 340 may dynamically alter the frames shown when the video summary 340 is presented. The frames may be altered based on a hierarchy. The hierarchy may be based on, for example, one or more of group MRF score, set MRF score, overall MRF score (score among all groups), topic score, frame rank, and group size.

Figure 7:
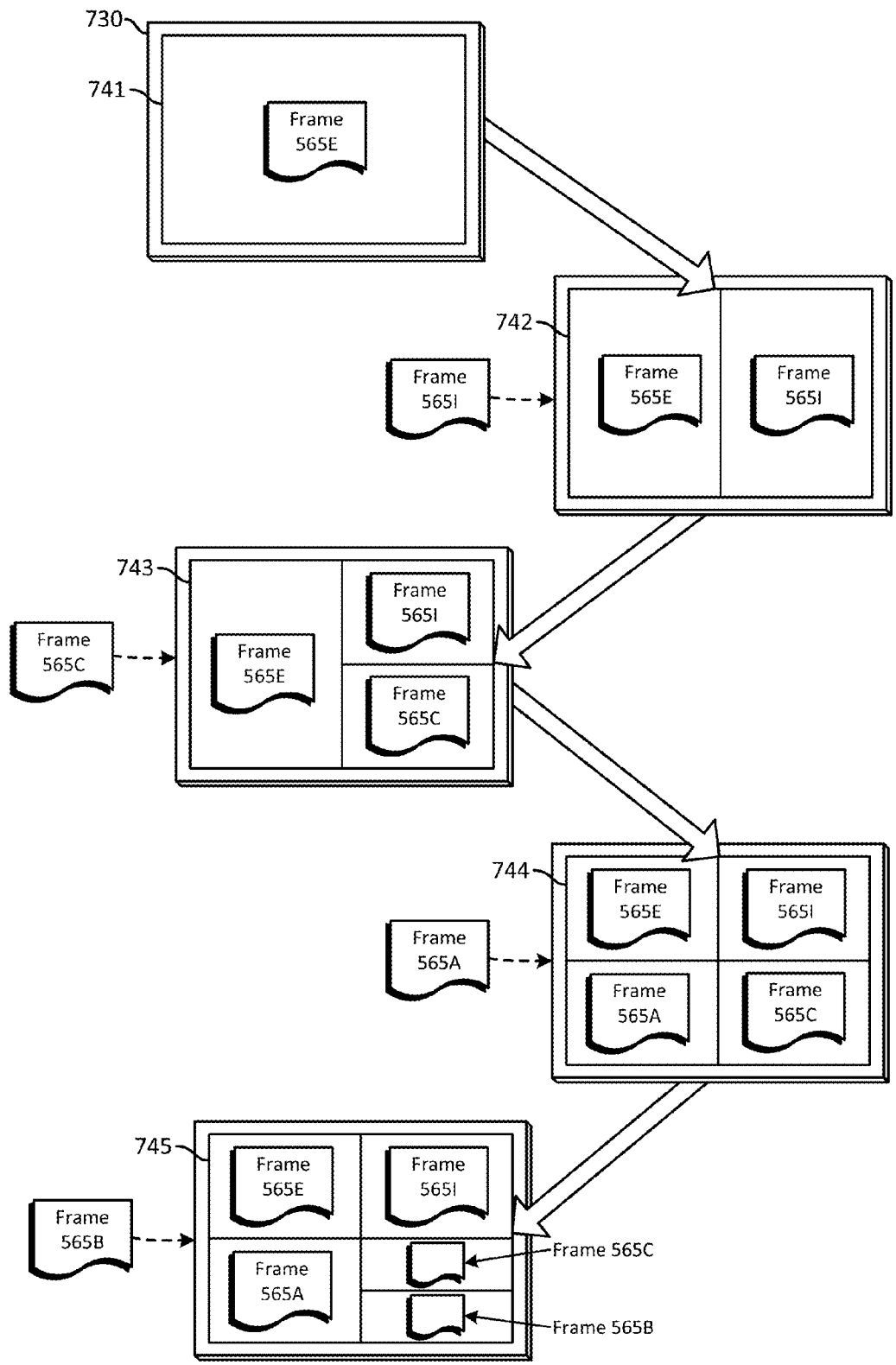
FIG. 7 illustrates an example embodiment of a frame display hierarchy and a dynamic display.

FIG. 7 illustrates an example embodiment of a frame display hierarchy and a dynamic display. The frames in the first group 660A, shown in the first score table 655, with the eight highest group MRF scores (frames 565A-F, H, I) are added to a video summary. The frames are arranged in a hierarchy based on their respective group MRF score, with the highest group MRF score assigned to the top of the hierarchy.

A display device 730 presents a display 741 that is generated according to the video summary 340, and the display shows frame 565E, which has the highest group MRF score. In response to a command (e.g., a command from a user, such as a click of a pointer or a touch signal on the display 741, or a timer expiration), the display 741 dynamically adds frame 565I (the frame with the second highest group MRF score) to produce the modified display 742. In response to a second command, the side of the modified display 742 that includes frame 565I is divided and frame 565C (the third highest group MRF score) is added to generate another modified display 743. In some embodiments, displays are modified based on the location of a user selection by dividing a part of the display indicated by the user selection to show one or more additional frames. In FIG. 7, if the command indicates the side of the modified display 742 that presents frame 565I, that side of the display is further divided in the next modified display 743 to present both frame 565I and frame 565C. In response to another user selection (e.g., indicating the side of the modified display 743 that includes frame 565E), the side of the modified display 743 that shows frame 565E is divided and frame 565A (the fourth highest group MRF score) is added to generate another modified display 744. Finally, in response to another user command (e.g., indicating the quadrant of the display that includes frame 565C), the quadrant of the modified display 744 that shows frame 565C is further divided and frame 565B (the fifth highest MRF score) is added to generate modified display 745. The dividing of the display and/or the adding of frames may continue until all frames in the video summary are included in the display and/or the display has been divided into a maximum number of portions (e.g., 4, 6, 10, 12, 16). Also, some embodiments may dynamically remove frames from the display as well as add frames. Also, some embodiments may, on a user click, for example, split the sub-frame having the largest current size. In some of these embodiments, if more than one sub-frames have the largest size, the sub-frame with the lower MRF score of the largest size sub-frames is split, thereby giving sub-frame size priority to the higher MRF score.

Figure 8:
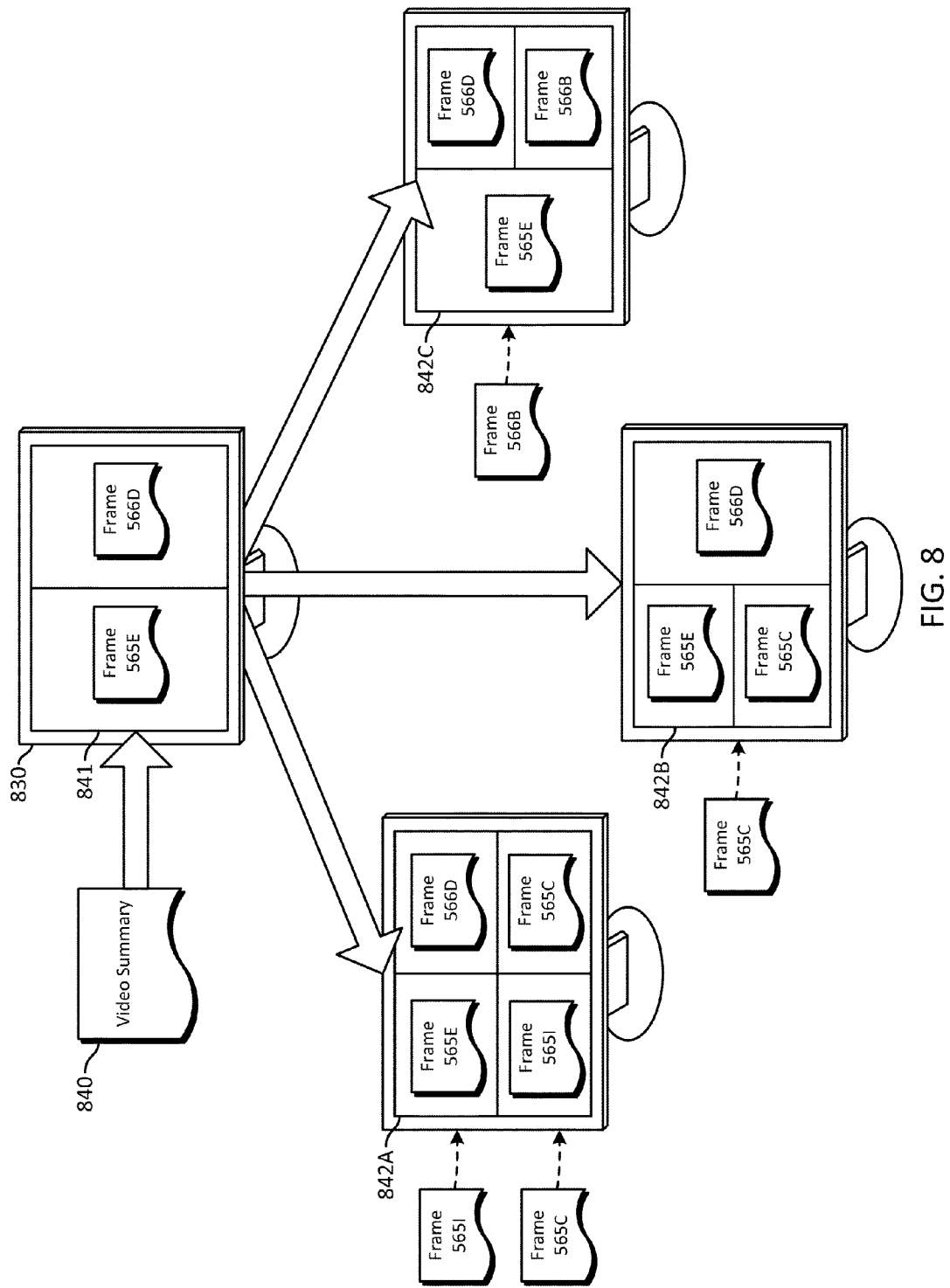
FIG. 8 illustrates example embodiments of a dynamic display that presents frames.

FIG. 8 illustrates example embodiments of dynamic displays that present frames. In this embodiment, a video summary 840 includes all of the frames from the first group 660A (shown in the first score table 655) and the second group 660B (shown in the second score table 656). A display device 830 presents a display 841. The display 841 includes frame 565E, which has the highest group MRF score from the first group 660A, and frame 566D, which has the highest group MRF score from the second group 660B. When a command is received, the display 841 dynamically changes. Depending on the embodiment, the display 841 may change into a first modified display 842A, a second modified display 842B, or a third modified display 842C.

In the embodiment that generates the first modified display 842A, in response to the command, the display 841 is modified by doubling the number of frames included in the display 841. The added frames are selected based on following priority: 1) the non-included frame with the highest group MRF score from a group of frames not associated with any frames included in the display; 2) the non-included frame with the highest overall MRF score of the frames with the highest set MRF score from the sets of frames not associated with any frames included in the display. Thus, frame 565I and frame 565C are included in the first modified display 842A, since no frames from set 575C or set 575A are included in the display, and since frame 565I has the highest set MRF score in set 575C and frame 565C has the highest set MRF score in set 575A.

In the embodiment that generates the second modified display 842B, in response to the command, the display 841 is modified by adding a frame to the side of the display 841 indicated in the received command, which is the side that includes 565E in this example. The added frame is selected based on the following priority: the non-included frame with the highest set MRF score of largest set not already having an included frame of the group of the frame shown in the selected portion of the display 841. Since frame 565E is the frame shown in the selected portion of the display, frame 565E is included in the first group 660A of frames, set 575A is the largest set in the first group 660A that does not have a frame already included in the display 841, and the frame with the highest set MRF score from set 575A is frame 565C, frame 565C is added to the display 841 to generate the second modified display 842B.

In the embodiment that generates the third modified display 842C, in response to the command, the display 841 is modified by adding a frame to the side of the display 841 indicated in the received command, which is the side that includes 566D in this example. The added frame is selected based on the non-included frame with the highest group MRF score of the group of the frame included in the side of the display 841 indicated by the command. Thus, since the second group 660B includes frame 566D, and since frame 566B has the highest group MRF score of the non-included frames of the second group 660B, frame 566B is included in the third modified display 842C.

Figure 9:
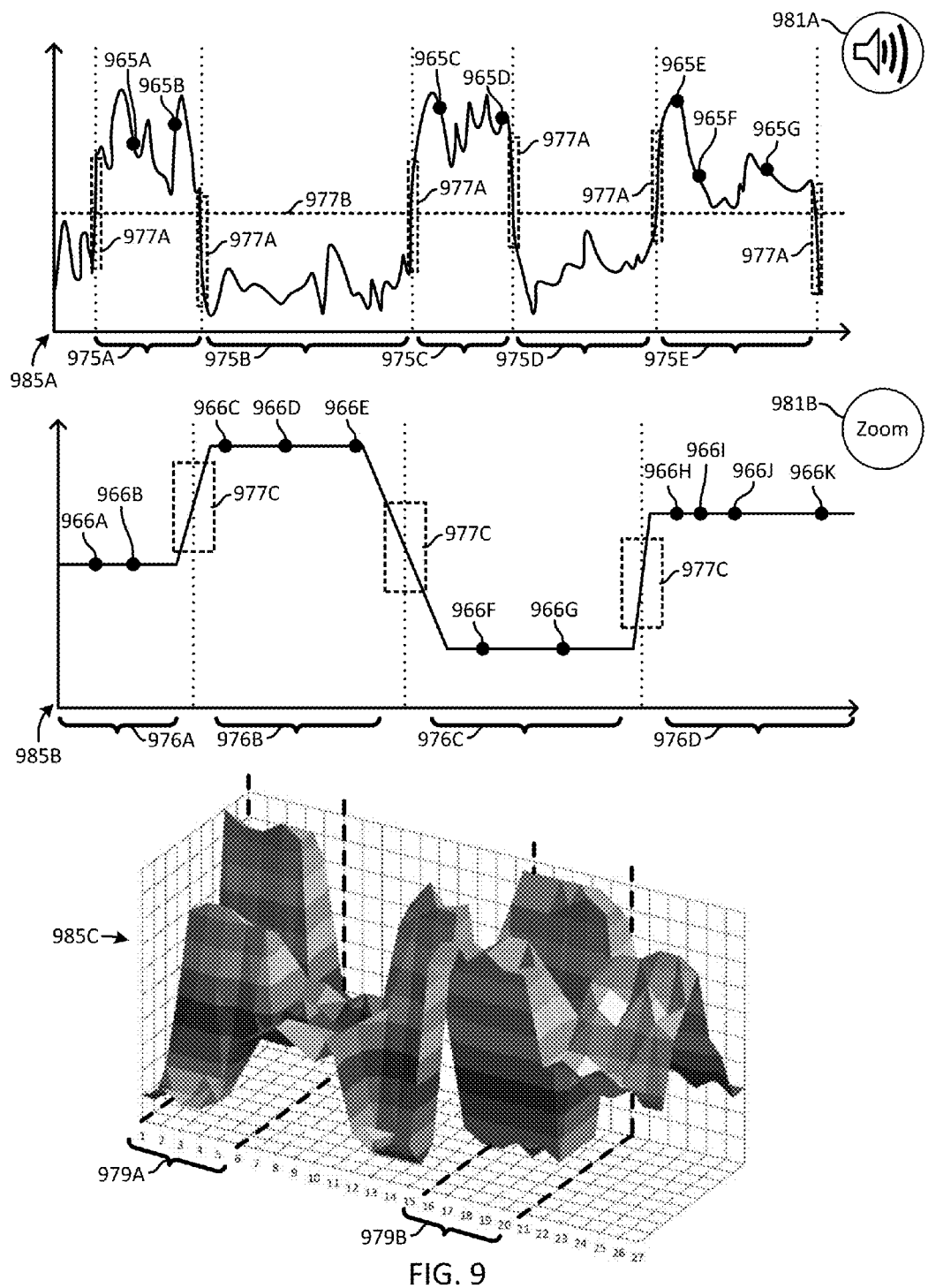
FIG. 9 illustrates example embodiments of group generation and group representation.

Following are additional examples of video summarization with reference to FIG. 9, which illustrates example embodiments of group generation and group representation. To generate a first graph 985A, which shows the sound volumes for respective frames on the vertical axis, a first video is input to the group generation block 373 in FIG. 3. The frames in the first video are sorted according to a sound volume change filter 981A. A first change threshold 977A is applied to the changes in the sound volume, sets of contiguous frames 975A-E between changes that exceed the change threshold 977A are selected, and the selected frames are assigned to one or more groups. In some embodiments, the frames in the frame sets 975A-E are assigned to groups corresponding to the frame sets 975A-E (one group per frame set). However, in some embodiments, a second volume threshold 977B is applied, and only frames with volumes exceeding the volume threshold 977B are added to one or more groups (or only frames in sets of frames that have a set average volume that exceeds the threshold). Thus, only sets 975A, 975C, and 975E are added to groups in these embodiments.

Next, continuing the example where only frame sets 975A, 975C, and 975 E are added to groups, the frames that were added to the groups are sent to block 363, where respective frame ranks are generated for the frames in the frame sets 975A, 975C, and 975E. The frames in the groups are then sent to block 353, where respective MRF scores are generated for the frames. Some frames 965A-G from the first video, which have the highest set/group MRF scores, are shown in FIG. 9.

Also referring to FIG. 9, to generate a second graph 985B, a second video is input to the group generation block 373. The frames in the second video are filtered according to a zoom change filter 981B. The second graph 985B shows the zoom for the respective frames on the vertical axis, with the frames organized in the same sequence the frames are presented in when the second video is played. A change threshold 977C is applied to the changes in the zoom, frames in sets of contiguous frames 976A-D between changes that exceed the change threshold 977C are selected, and the frames are assigned to one or more groups.

Next, the frames are sent to block 363, where respective frame ranks are generated for the frames in the group(s). The frames in the group(s) are then sent to block 353, where respective MRF scores are generated for the frames. Some frames 966A-K with the highest set/group MRF scores are shown in the second graph 985B. In embodiments where MRF score generation in block 363 includes a local max 354E, frames 966H-J may be found to be within a predetermined distance of each other, and the two frames of the three that have the lowest MRF scores may be removed from the group or their MRF score may be further lowered. Also, the frame with the local maximum MRF score of the three may be assigned a higher MRF score.

Additionally, FIG. 9 illustrates a third graph 985C that shows a tone histogram for a third video, with the tonal values shown on the vertical axis. The frames may be filtered based on the sum of the histogram for a frame, specified tonal ranges exceeding one or more associated thresholds, changes exceeding a threshold, tonal ranges falling within a certain range, etc. The third graph 985C shows two sets of frames 979A and 979B that include frames whose respective tonal values comply with a threshold.

Figure 10:
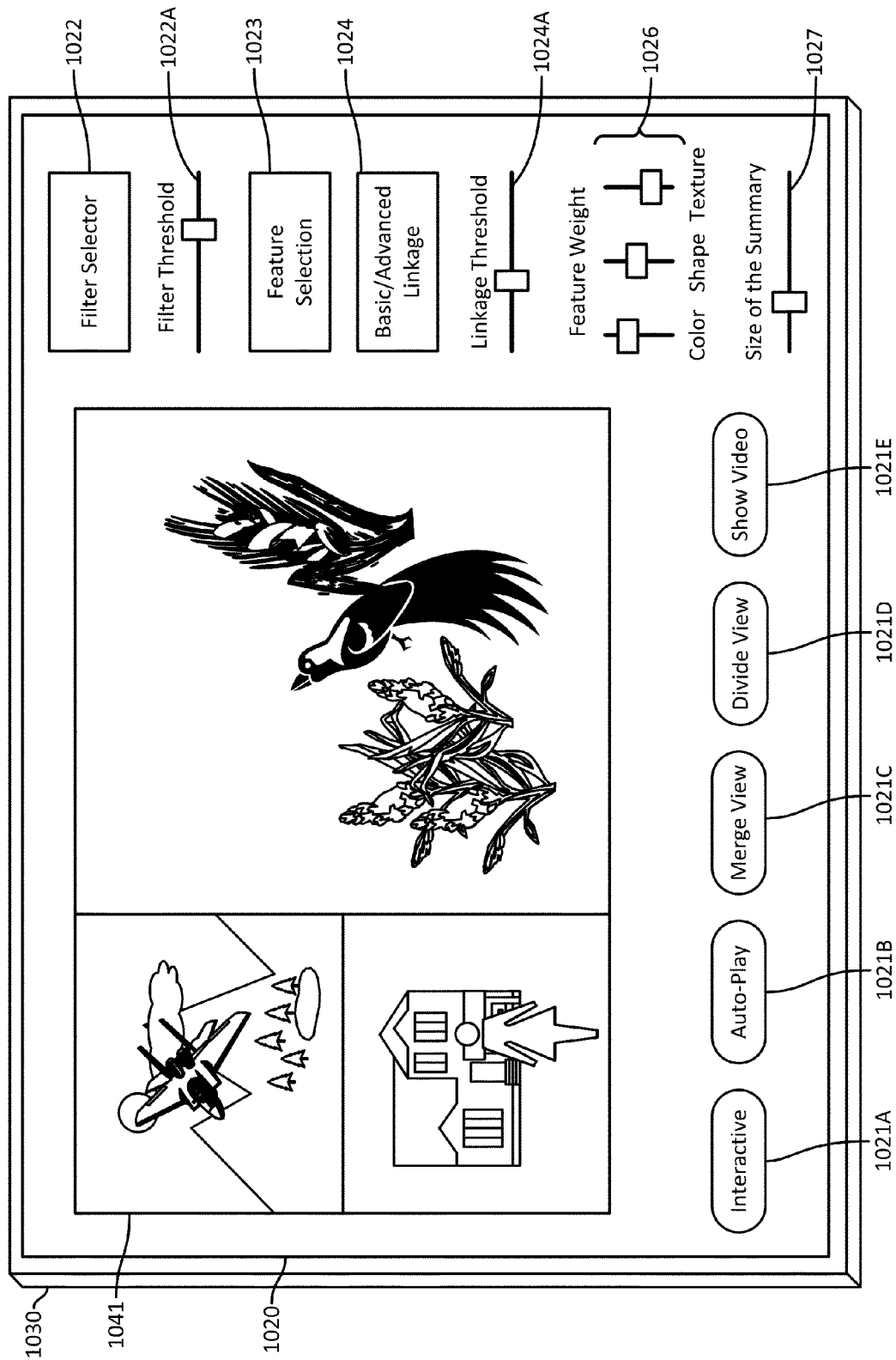
FIG. 10 illustrates an example embodiment of a user interface for video summarization.

FIG. 10 illustrates an example embodiment of a user interface 1020 for video summarization. The user interface 1020 may be rendered on a display device 1030, and the user interface 1020 may include a display of a video summary 1041 (also referred to herein as the "display 1041") that shows one or more frames from the video summary. The user interface 1020 also includes a plurality of controls 1021-1027. Though a computing device implements the function(s) associated with a control, for purposes of description a control may be described as performing a function. The display controls 1021A-E are configured to receive user commands to adjust the display of the video summary 1041. The interactive control 1021A may be activated by a user to change (e.g., cause a computing device to change) the display 1041 in response to user selections of parts of the display 1041. For example, once interactive mode is on, a user may point to and select (e.g., via a mouse or a touch screen) a part of the display 1041 to initiate a change of the display 1041 (e.g., by changing the displayed frame, by adding an additional frame to the display, by removing a frame from the display). When the interactive mode is off, the user interface is configured not to respond to pointing and selecting of the display 1041.

The auto-play control 1021B may be used to start or stop an automatic change of the display 1041 that cycles through all of the frames in the video summary. The merge view control 1021C may be used to reduce the number of frames presented by the display 1041. The divide view control 1021D may be used to increase the number of frames presented by the display 1041. The show video command 1021E may be activated to allow a user to select a frame from the display 1041 and start play of the video at (or within a predetermined time period before) the selected frame, or it may start playing the video in all of the frames shown in the display 1041 (thus multiple views of the video may be played simultaneously).

Figure 11:
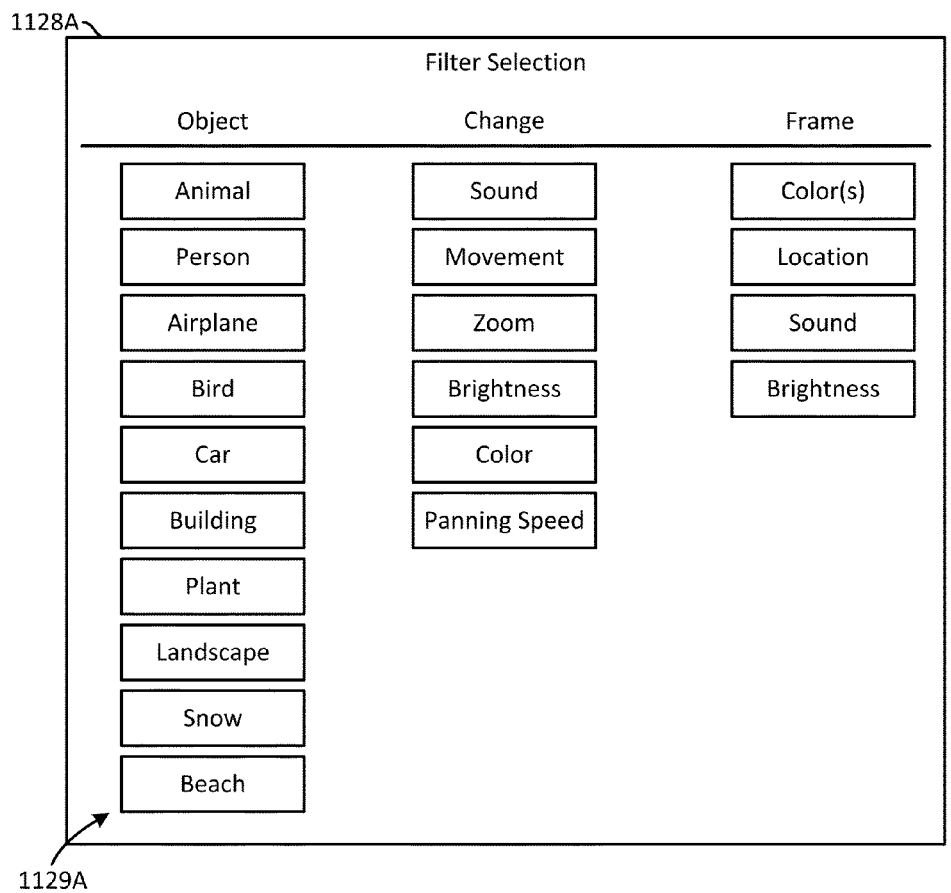
FIG. 11 illustrates example embodiments of user interfaces for video summarization.
Figure 11:
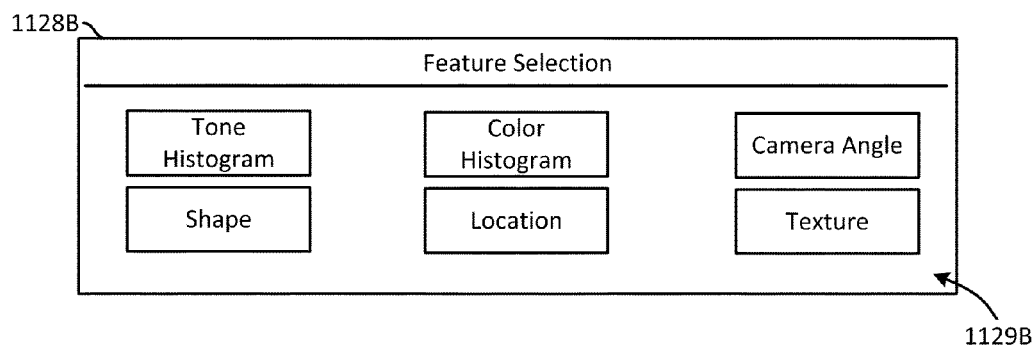

A filter selector control 1022 may be used to select one or more topic filters that will be used to summarize a video (e.g., filters in the group generation block 343 of FIG. 3). Activation of the filter selector control 1022 may cause a filter selection interface 1128A, shown in FIG. 11, to be presented to a user (e.g., presented by a computing device and a display device). The filter selection interface 1128A includes a plurality of controls 1129A that allow a user to select one or more filters. Returning to FIG. 10, the filter threshold selection control 1022A allows a user to set a threshold that will be used when analyzing frames based on the selected filter(s) (e.g., a topic score of a frame must exceed the threshold, a sound volume must exceed a value).

A feature selection control 1023 may be used to select one or more features that will be used to generate frame ranks (e.g., in block 363 in FIG. 3). Activation of the feature selection control 1023 may cause a feature selection interface 1128B, shown in FIG. 11, to be presented to a user. The feature selection interface 1128B includes a plurality of controls 1129B that allow a user to select one or more features.

The basic/advanced linkage control 1024 allows a user to select whether frame links have binary values (e.g., either 1 or 0), whether frame links will have values in a continuous range of values (e.g., any value between 0 and n, where n is the maximum possible link value), or whether frame links will have a combination of continuous values and binary values. The linkage threshold selection control 1024A allows a user to set a threshold that will be used when generating frame links based on one or more features (e.g., when generating links based on the feature, a link value must exceed the threshold). The feature weight control 1026 allows a user to set the respective weights, $q_k$, for example, that will be given to one or more features when generating frame ranks based on the features (e.g., a weight given to a link). In the embodiment of FIG. 10, the feature weight control 1026 allows a different threshold and/or weight to be set for color, shape, and texture. Finally, the size of the summary control 1027 allows a user to select the number of frames that will be included in the video summary.

In some embodiments, user controls may be added to or omitted from the user interface 1020. Additionally some of these controls can be controlled by using a predetermined pointing device, a screen touch, keyboard sequences, or gestures. Additionally, not all controls need to be specified or set by the user, and some controls may instead use predetermined settings or adaptively determine the settings.

The above described devices, systems, and methods can be achieved by supplying one or more computer-readable media having stored thereon computer-executable instructions for realizing the above described operations to one or more computing devices that are configured to read the computer-executable instructions stored in the one or more computer-readable media and execute them. In this case, the systems and/or devices perform the operations of the above-described embodiments when executing the computer-executable instructions read from the one or more computer-readable media. Also, an operating system on the one or more systems and/or devices may implement the operations of the above described embodiments. Thus, the computer-executable instructions and/or the one or more computer-readable media storing the computer-executable instructions therein constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a computer-readable medium for the computer-executable instructions. The computer-executable instructions may be written to a computer-readable medium provided on a function-extension board inserted into the device or on a function-extension unit connected to the device, and a CPU provided on the function-extension board or unit may implement the operations of the above-described embodiments.

This disclosure has provided a detailed description with respect to particular explanatory embodiments. However, the scope of the appended claims is not limited to the above-described embodiments and includes various modifications and equivalent arrangements.

What is claimed is:

1. A method for presenting video content, the method comprising:
    assigning a first plurality of frames of a video to a first group based on a first topic;
    assigning a second plurality of frames of the video to a second group based on the first topic, wherein the video includes at least the first plurality of frames and the second plurality of frames;
    generating respective pairwise similitude measurements for pairs of frames in the first plurality of frames based on a first feature, wherein a pair of frames in the pairs of frames includes a first frame and a second frame, and wherein a pairwise similitude measurement indicates a similarity of the first frame to the second frame;
    ranking the frames in the first plurality of frames relative to the other frames in the first plurality of frames based on the respective pairwise similitude measurements of the frames in the first plurality of frames;
    selecting a frame from the first plurality of frames as a most representative frame based on the respective ranks of the frames in the first plurality of frames;
    generating respective pairwise similitude measurements for pairs of frames in the second plurality of frames based on a second feature;
    ranking the frames in the second plurality of frames relative to the other frames in the second plurality of frames based on the respective pairwise similitude measurements of the frames in the second plurality of frames; and
    selecting a frame from the second plurality of frames as a most representative frame based on the respective ranks of the frames in the second plurality of frames.

2. The method of claim 1, wherein generating pairwise similitude measurements includes generating links between the first frame and the second frame in the pairs of frames.

3. The method of claim 2, wherein links are generated according to $$L_{ij} = \begin{cases} 1 & s(x_i, x_j) > \theta \text{ and } i \neq j \\ 0 & \text{otherwise,} \end{cases}$$

where $s(x_i,x_j)$ denotes a similarity measurement function between two frames based on a feature, and $\theta$ is a threshold to define a link based on a similarity of the two frames.

4. The method of claim 3, wherein frames are ranked according to $$p_i = (1-d) + d \sum_{j=1}^{N} \left(\frac{L_{ij}}{c_j}\right) p_j,$$

where $c_j = \sum_{j=1}^{N} L_{ij}$ is the number of frames pointed to by the j-th frame and d is a predetermined parameter.

5. The method of claim 2, wherein the first topic is a person, vehicle, animal, building, plant or geographical feature.

6. The method of claim 1, wherein the first feature is a sound, a color, a texture, a light gradient, a white balance, a light intensity, a volume, a location, camera exposure, zoom, or a light histogram.

7. The method of claim 1, wherein generating the respective pairwise similitude measurements for the pairs of frames in the first plurality of frames is further based on two or more third features.

8. The method of claim 7, wherein generating the pairwise similitude measurements includes generating links, and links and are generated according to $$L_{ij}^k = \begin{cases} q_k, & s_k(x_i^k, x_j^k) > \theta_k \text{ and } i \neq j \\ 0 & \text{Otherwise,} \end{cases}$$

where k is the total number of features, $x_i^k$ is the k-th feature of the i-th frame, $s_k(x_i^k,x_j^k)$ denotes a similarity measurement function for the k-th feature between two frames, $q_k$ denotes a prior for the k-th feature, and $\theta$ is a threshold to define a link based on a similarity of the two frames.

9. The method of claim 1, wherein selecting a frame from the first plurality of frames as the most representative frame is further based on a criterion associated with the first topic.

10. The method of claim 1, further comprising generating a video summary that includes the frame selected from the first plurality of frames as the most representative frame and the frame selected from the second plurality of frames as the most representative frame.

11. The method of claim 1, wherein
generating the respective pairwise similitude measurements for the pairs of frames in the first plurality of frames based on the first feature includes generating pairwise similitude measurements for all possible pair combinations of the frames in the first plurality of frames.

12. One or more non-transitory computer-readable media storing computer executable instructions that, when executed by one or more computing devices, cause the one or more computing devices to perform operations comprising:
assigning frames in a video to one of two or more groups based on a topic;
generating respective first pairwise similitude measurements for pairs of frames in a group based on a feature, wherein a pair of frames in the pairs of frames includes a first frame and a second frame, and wherein a pairwise similitude measurement indicates a similarity of the first frame to the second frame;
ranking the frames in a group relative to other frames in the group based on the respective first pairwise similitude measurements of the respective frames; and
selecting one or more frames from each group as most-representative frames based on the respective ranks of the frames in a group relative to the other frames in the group.

13. The one or more non-transitory computer-readable media of claim 12, wherein ranking the frames in a group relative to the other frames in the group is further based on a total number of frames in the group.

14. The one or more non-transitory computer-readable media of claim 13, wherein ranking the frames in a group relative to the other frames in the group is further based on a local maximum in the respective first pairwise similitude measurements for the frames in the group.

15. The one or more non-transitory computer-readable media of claim 12, wherein the operations further comprise:
generating respective second pairwise similitude measurements for the frames in a group relative to the other frames in the group, wherein ranking the frames in a group relative to other frames in the group is further based on the respective second pairwise similitude measurements for the respective frames.

16. A system for presenting video content, the system one or more computer-readable media configured to store a video, a first topic, and a first similarity measurement function; and one or more processors configured to cause the system to assign a first plurality of frames of the video to a first group based on the first topic; generate respective pairwise similitude measurements for pairs of frames in the first plurality of frames based on a first similarity measurement function, wherein a pair of frames in the pairs of frames includes a first frame and a second frame, and wherein a pairwise similitude measurement indicates a similarity of the first frame to the second frame; rank the frames in the first plurality of frames relative to the other frames in the first plurality of frames based on the respective pairwise similitude measurements of the frames in the first plurality of frames; and select a frame from the first plurality of frames as a first most representative frame based on the respective ranks of the frames in the first plurality of frames.

17. The system of claim 16, wherein generating a pairwise similitude measurement includes generating links, and links are generated according to $$L_{ij} = \begin{cases} \exp\left\{-\dfrac{[d(x_i, x_j)]^2}{(2\sigma^2)}\right\} & i \neq j \\ 0 & i = j, \end{cases}$$

where $d(x_i,x_j)$ is a dissimilarity based at least in part on a pairwise similarity measurement function of a feature between two frames, and $\sigma$ is a parameter that may be fixed, estimated globally, or may be estimated locally around frame i, frame j, or both frame i and frame j.

18. The system of claim 17, wherein the links are further generated according to $$L'_{ij} = \begin{cases} L_{ij} & L_{ij} > \theta \\ 0 & \text{otherwise.} \end{cases}$$

19. The system of claim 16, wherein the processors are further configured to cause the system to generate a video summary that includes the first most representative frame.

20. The systems of claim 16, wherein the one or more processors are further configured to cause the system to assign a second plurality of frames of the video to a second group based on a second topic; generate respective pairwise similitude measurements for pairs of frames in the second plurality of frames based on a second similarity measurement function; rank the frames in the second plurality of frames relative to the other frames in the second plurality of frames based on the respective pairwise similitude measurements of the frames in the second plurality of frames; and select a frame from the second plurality of frames as a second most representative frame based on the respective ranks of the frames in the second plurality of frames.

\* \* \* \* \*